United States Patent [19]
Soma et al.

[11] Patent Number: 5,411,767
[45] Date of Patent: May 2, 1995

[54] METHOD FOR PRODUCING INTERCONNECTOR FOR SOLID ELECTROLYTE TYPE FUEL CELL

[75] Inventors: Takao Soma, Aichi; Shinji Kawasaki, Nagoya; Shigenori Ito, Kasugai; Katsuki Yoshioka, Nagoya, all of Japan

[73] Assignee: NGK Insulators, Ltd., Japan

[21] Appl. No.: 941,890

[22] Filed: Sep. 8, 1992

[30] Foreign Application Priority Data

Jul. 27, 1992 [JP] Japan .................................. 4-199754

[51] Int. Cl.$^6$ .......................... B05D 1/08; B05D 5/12; H01M 8/10
[52] U.S. Cl. .................................. 429/453; 427/115; 427/376.2; 429/31
[58] Field of Search ...................... 427/115, 453, 376.2; 429/30, 31, 33

[56] References Cited

U.S. PATENT DOCUMENTS

| | | | |
|---|---|---|---|
| 4,358,475 | 11/1982 | Brown et al. | 427/453 |
| 4,526,812 | 7/1985 | Iacovangelo et al. | 427/115 |
| 4,562,124 | 12/1985 | Ruka | 429/31 |
| 4,631,238 | 12/1986 | Ruka | 429/30 |
| 4,749,632 | 6/1988 | Flandermeyer et al. | 429/33 X |
| 4,910,100 | 3/1990 | Nakanishi et al. | 429/32 |
| 5,114,803 | 5/1992 | Ishihara et al. | 429/31 X |

FOREIGN PATENT DOCUMENTS 61-198569 9/1986 Japan.
61-198570 9/1986 Japan.

OTHER PUBLICATIONS

Cell Debate, "Characterization of a CA Doped LaCrO$_3$..." Iwata et al., Sep. 17, 1991, p. 205.
Sunshine Journal, vol. 2, No. 1, pp. 26–37, Jun. 1981.

*Primary Examiner*—John S. Maples
*Attorney, Agent, or Firm*—Parkhurst, Wendel & Rossi

[57] ABSTRACT

A method for producing interconnectors for electrically connecting unit cells of a solid electrolyte type fuel cell. An interconnector material such as a perovskite complexed oxide is thermally sprayed onto the surface of an electrode of a solid electrolyte type fuel cell by plasma thermal spraying process at a temperature of not lower than 1,250° C. to form an interconnector, and heat treated to diminish the cracks and defects resulting from the plasma thermal spraying process.

11 Claims, 2 Drawing Sheets

METHOD FOR PRODUCING INTERCONNECTOR FOR SOLID ELECTROLYTE TYPE FUEL CELL

BACKGROUND OF THE INVENTION

FIELD OF THE INVENTION

The present invention relates to a method for producing interconnectors for electrically connecting unit cells of a solid electrolyte type fuel cell.

DESCRIPTION OF THE PRIOR ART

The solid electrolyte type fuel cell (referred to hereinafter "SOFC") operates at high temperatures such as 1,000° C., so that the reaction of electrodes is very vigorous. Moreover, the SOFC has low polarization and relatively high output voltage without requiring any catalyst of an expensive noble metal such as platinum, so that energy conversion efficiency is much higher than those of the other fuel cells. Moreover, the SOFC is stable and has long service life, because all the constructional materials of the SOFC are solid.

With such a SOFC, fuel electrodes and air electrodes of the adjacent SOFC elements (unit cells) are connected in series through interconnectors and connection terminals. Therefore, it is desired to make the interconnectors thinner to reduce electrical resistance therein.

In order to form thinner interconnectors, it may be conceived to use the chemical vapor deposition process (CVD), the electrochemical vapor deposition process (EVD) or the like. With such processes, apparatuses for forming films may become bulky, and areas to be treated are too small and treating speeds are too slow.

On the other hand, the plasma thermal spray process can form thinner and relatively denser films at higher speeds for producing the SOFC and is superior to the above processes. The use of the plasma thermal spray process for producing the SOFC has been known (Sunshine, vol. 2, No. 1, 1981). Moreover, it has been known that a material for thermal material spraying is prepared which is a solid solution of cerium oxide or zirconium oxide and metallic oxide such as alkaline earth metals, rare earth elements or the like, and after the grain size of the material for thermal spraying is adjusted, the material is thermal sprayed by a plasma thermal spray gun to form a solid electrolyte film (Japanese Patent Application Laid-open Nos. 61-198,569 and 61-198,570).

In general, however, the plasma thermal sprayed films have large porosities and are insufficient in air-tightness for interconnectors of SOFC. In plasma thermal spraying, moreover, cracks and laminar defects tend to occur in the films, which permit hydrogen, carbon monoxide and the like to flow through the interconnectors to cause fuel leakage. As a result, the electromotive force per unit cell of SOFC becomes low, for example, less than normal 1 volt, so that the output of the SOFC is lower resulting in low conversion efficiency in converting the fuel to electric power.

In this case, if the film of the interconnector is thicker, the fuel leakage can be prevented, but the resistance of the cell becomes higher to lower its output. Therefore, it is desirable that the interconnector is airtight, while a film of the interconnector is thinner within a range capable of preventing the fuel leakage, thereby increasing the output of the cell.

In general, lanthanum chromite has been used for the material of the interconnector. However, it is difficult to make dense the lanthanum chromite by sintering. It is therefore difficult to produce practically useful interconnectors having high relative density from lanthanum chromite.

SUMMARY OF THE INVENTION

It is an object of the invention to provide a method for producing an interconnector for SOFC which is sufficiently thin and air-tight and is free from fuel leakage.

In order to accomplish this object, the method for producing an interconnector for a solid electrolyte type fuel cell, comprises steps of thermally spraying an interconnector material onto the surface of an electrode of a solid electrolyte type fuel cell to form a thermally sprayed film, and treating the thermally sprayed film by heating to form an interconnector.

The expression "thermally spraying an interconnector material onto the surface of an electrode" in the above is intended to include the following features.

1. An air electrode film is formed on the surface of a porous substrate, and the interconnector material is then thermally sprayed onto the surface of the air electrode film.
2. A fuel electrode film is formed on the surface of a porous substrate, and the interconnector material is then thermally sprayed onto the surface of the fuel electrode film.
3. The interconnector material is thermally sprayed onto the surface of an air electrode substrate made of an air electrode raw material.
4. The interconnector material is thermally sprayed onto the surface of a fuel electrode substrate made of a fuel electrode raw material.

According to the invention, at first the thermally sprayed film is formed and the film is then heat-treated to form an interconnector. Therefore, all that is required for carrying out the invention is a usual plasma thermal spray gun and an electric furnace for the heat treatment. Consequently, the method according to the invention can be technically more easily performed in comparison with the electrochemical vapor deposition process and the chemical vapor deposition process, and can be carried out over wider treatment areas at faster treating speeds and with lower cost.

According to the method of the invention, by treating the thermal sprayed film by heating, the open pores in the film are changed to closed pores to eliminate fine cracks and defects peculiar to the plasma thermal spray process. As a result, the relative density of the interconnector is increased to achieve its lower porosity and air-tightness. By the heat-treatment, moreover, the crystalline phases of the film become a homogeneous single phase and the film is microstructually homogenized so that the electrical conductivity of the interconnector can be improved.

By forming the interconnector for SOFC from such a dense and thin film according to the invention, the resistance in the interconnector and hence the SOFC can be lowered, while preventing the fuel leakage in the interconnector. Consequently, the output of the SOFC can be considerably increased by the synergism of these effects.

The invention will be more fully understood by referring to the following detailed specification and claims taken in connection with the appended drawings.

Figure 1:
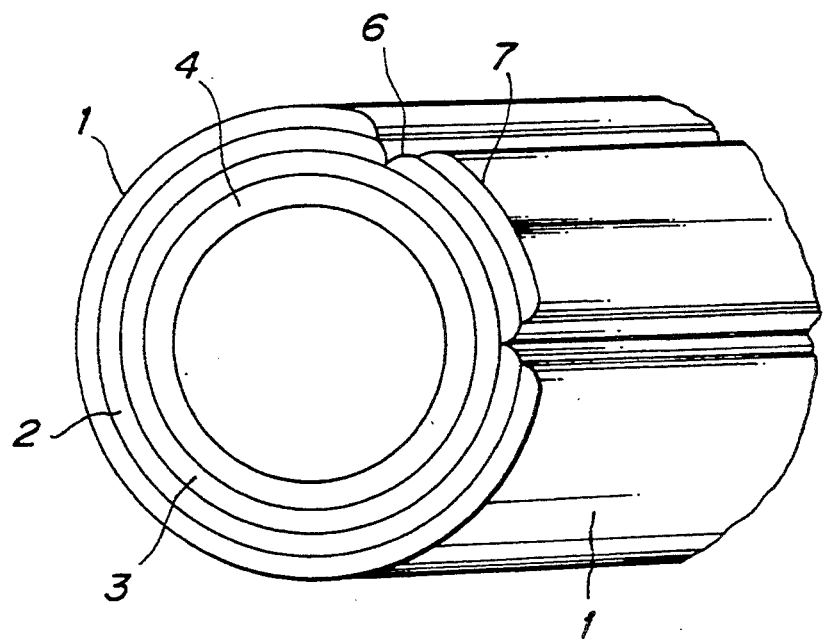
FIG. 1 is a partially removed perspective view of a tubular SOFC according to one embodiment of the invention.

In the drawings, the following reference numerals designate the following structures;

1... fuel electrode film 2... solid electrolyte
3... air electrode film 6... interconnector
... connection terminal
13... air electrode substrate

DESCRIPTION OF THE PREFERRED EMBODIMENTS

The material of the interconnector to be produced according to the invention is preferably a perovskite complexed oxide represented by $ABO_3$. Perovskite complexed oxides suitable for the interconnector will be classified and explained hereinafter.

1. Lantahum Chromite Series

These oxides which belong to this series are indicated by the following formula.

$$(La_{1-x}D_x)_{1-u}(Cr_{1-y}E_y)_{1-w}O_3$$

$$(0 < x \leq 0.3,\ 0 \leq y \leq 0.3,\ ) \leq u,\ w \leq 0.1)$$

This oxide includes an element D which partially substitutes for lanthanum crystallographic positions at the A site. An element E may be partially substituted in chromium crystallographic positions at the B site. Moreover, the A and B sites may be partially defected.

The element D is preferably one or more elements selected from the group consisting of rare earth elements except lanthanum and alkaline earth metals except magnesium, and more preferably one or more elements selected from the group consisting of yttrium, cerium, praseodymium, neodymium, samarium, gadolinum, dysprosium, holumium, erbium, ytterbium, calcium, strontium and barium. Among these elements, one or more elements are particularly preferable which are selected from the group consisting of yttrium, cerium, ytterbium, calcium, strontium and barium. Furthermore, if one or more elements are used which are selected from the group consisting of calcium, strontium and barium, the electrical conductivity of the interconnector is more further improved.

The element E is preferably one or more elements selected from the group consisting of titanium, vanadium, manganese, iron, cobalt, nickel, copper, zinc, magnesium, aluminum, lead, ruthenium, rhenium, niobium, molybdenum and tungsten. Among these elements, one or more elements are more preferable which are selected from the group consisting of titanium, manganese, iron, cobalt, nickel, copper and zinc. These elements serve to improve the density of an interconnector.

2. Non-Lanthanum Series, Chromium Series Complexed Oxides

These oxides are indicated by the following formula.

$$A_{1-u}(Cr_{1-y}E_y)_{1-w}O_3$$

$$(0 \leq y \leq 0.3,\ 0 \leq u,\ w \leq 0.1)$$

This oxide does not include lanthanum at the A site but includes chromium as a main element at the B site. An element E may partially substitute for chromium crystallographic positions at the B site. Moreover, the A and B sites may be partially defected.

The element A is preferably one or more elements selected from the group consisting of rare earth elements except lanthanum and alkaline earth metals except magnesium, and more preferably one or more elements selected from the group consisting of yttrium, cerium, praseodymium, neodymium, samarium, gadolinum, dysprosium, holumium, erbium, ytterbium, calcium, strontium and barium. Among these elements, one or more elements are particularly preferable which are selected from the group consisting of yttrium, cerium, ytterbium, calcium, strontium and barium.

The element E is preferably one or more elements selected from the group consisting of titanium, vanadium, manganese, iron, cobalt, nickel, copper, zinc, magnesium, aluminum, lead, ruthenium, rhenium, niobium, molybdenum and tungsten. Among these elements, one or more elements are more preferable which are selected from the group consisting of titanium, manganese, iron, cobalt, nickel, copper and zinc. These elements serve to improve the density of an interconnector.

With the complexed oxides described above, an atomic percent of more than 70% and less than 100% in the A site is preferably occupied by yttrium, cerium or ytterbium, and more preferably by yttrium. In the case that an atomic percent of more than 70% and less than 100% in the A site is occupied by a rare earth element or elements, if an atomic percent of less than 30% in the A site is substituted by one or more elements selected from the group consisting of calcium, strontium and barium, the electrical conductivity of the interconnector is more improved.

3. Lanthanum Series, Non-Chromium Series Complexed Oxides

These oxides are expressed by the following formula.

$$(La_{1-x}D_x)_{1-u}B_{1-w}O_3$$

$$(0 \leq x \leq 0.3,\ 0 \leq u,\ w \leq 0.1)$$

These oxides do not include chromium at the B site but include lanthanum as a main element at the A site. An element D may partially substitute for lanthanum crystallographic positions at the A site.

The element D is preferably one or more elements selected from the group consisting of rare earth elements except lanthanum and alkaline earth metals except magnesium, and more preferably one or more elements selected from the group consisting of yttrium, cerium, praseodymium, neodymium, samarium, gadolinum, dysprosium, holumium, erbium, ytterbium, calcium, strontium and barium. Among these elements, one or more elements are particularly preferable which are selected from the group consisting of yttrium, cerium, ytterbium, calcium, strontium and barium. Furthermore, if one or more elements are used which are selected from the group consisting of calcium, strontium and barium, the electrical conductivity of the interconnector is more improved.

The element B is preferably one or more elements selected from the group consisting of titanium, vanadium, manganese, iron, cobalt, nickel, copper, zinc, magnesium, aluminum, lead, ruthenium, rhenium, niobium, molybdenum and tungsten. Among these elements, one or more elements are more preferable which are selected from the group consisting of titanium, manganese, iron, cobalt, nickel, copper and zinc.

Moreover, the element D is preferably one or more elements selected from the group consisting of calcium, strontium and barium, while the element B is preferably one or more elements selected from the group consisting of iron, nickel, copper, manganese and cobalt, more preferably from a group consisting of iron, manganese and cobalt.

4. Non-Lanthamum Series, Non-Chromium Series Complexed Oxides

These oxides are expressed by the following formula.

$$A_{1-u}B_{1-2}O_3$$

$$(0 \leq u, w \leq 0.1)$$

The element A is preferably one or more elements selected from the group consisting of rare earth elements except lanthanum and alkaline earth metals except magnesium, and more preferably one or more elements selected from the group consisting of yttrium, cerium, praseodymium, neodymium, samarium, gadolinum, dysprosium, holumium, erbium, ytterbium, calcium, strontium and barium. Among these elements, one or more elements are particularly preferable which are selected from the group consisting of yttrium, cerium, ytterbium, calcium, strontium and barium.

The element B is preferably one or more elements selected from the group consisting of titanium, vanadium, manganese, iron, cobalt, nickel, copper, zinc, magnesium, aluminum, lead, ruthenium, rhenium, niobium, molybdenum and tungsten. Among these elements, one or more elements are more preferable which are selected from the group consisting of titanium, manganese, iron, cobalt, nickel, copper and zinc.

Moreover, complexed oxides expressed by the following formula, are particularly preferable.

$$(Y_{1-x}G_x)_{1-u}(Fe_{1-y}J_y)_{1-w}O_3$$

$$(0 \leq x, y 0.3, 0 \leq u, w \leq 0.1)$$

In the above formula, if one or more elements which are selected from the group consisting of calcium, strontium and barium is used as the element G, the electrical conductivity of the interconnector is more improved. Preferable elements for the element J are nickel, copper, iron, cobalt or manganese.

Among the perovskite complexed oxides described above, those of the lanthanum chromite series are superior in electrical conductivity, thermal expansion and the like for interconnectors.

With the complexed oxides containing lanthanum, $La_2O_3$ phase precipitates in the perovskite phase to cause moisture absorption. Moreover, as the $La_2O_3$ powder as the raw material is very prone to absorb moisture, it rapidly absorbs moisture during storage, and at the time of opening and weighing to increase the apparent weight. Therefore, it becomes difficult to measure the exact weight of the $La_2O_3$ powder so that the La content in the interconnector tends to deviate from the desired value, with the result that the desired electrical conductivity and thermal expansion coefficient could not be obtained. The non-lanthanum series, chromium series complexed oxides and the non-lanthanum series non-chromium series complexed oxides are free from such problems.

With the complexed oxides containing chromium, there is a risk of producing very noxious hexavalent chromium ions. From this viewpoint, the complexed oxides not containing chromium are preferable.

When the interconnector is formed from the perovskite complexed oxides $ABO_3$, the following two kinds of materials can be used as interconnector materials.
1. Material mixed with powders of compounds of the respective metallic elements
2. Powder of the perovskite complexed oxides These raw powder materials may be ground powders. Preferably, however, they may be granulated and highly fluidizable powder which makes easy thermal spraying thereof.

Furthermore, it is preferable to mix and fire the respective powders of the compounds of the metallic elements and to produce synthetic products of perovskite complexed oxides. In such a case, the compounds of the metallic elements are typically oxides, carbonates, acetates or the like.

The synthetic products described above are then pulverized to obtain a powder material. It is preferable to add to the powder material with a medium such as water to form a slurry which is then dried to obtain a granulated powder. In this case, moreover, the granulated powder preferably has an average grain diameter of 3-100 μm. If it is less than 3 μm, the grains are too fine thus making it difficult to carry out the thermal spray process. On the other hand, if it is more than 100 μm, the grains are not completely melted in the thermal spray process and incompletely melted grains tend to stick on the electrodes, making it difficult to obtain densified films.

The thermal spray of the powder may be effected by the plasma thermal spraying process. The low pressure plasma thermal spraying process brings about better results. However, if sprayed films are formed by the normal pressure plasma thermal spraying process, sufficiently densified interconnectors can be obtained by the succeeding heat treatment.

The heat treatment of the sprayed films is preferably performed at a temperature of not lower than 1250° C. If it is lower than 1250° C., it may be difficult to densify the sprayed films, and the doped element such as calcium may be dedoped (removal of the dopant) to make it difficult to obtain uniform crystalline phases.

FIG. 1 illustrates one example of the tubular solid electrolyte type fuel cell according to the invention in a partially removed perspective view. Referring to FIG. 1, the solid electrolyte type fuel cell comprises a tubular porous ceramic substrate 4, an air electrode film 3 provided on its outer circumference, a solid electrolyte film 2 along the outer circumference of the air electrode film 3, and a fuel electrode film 1 provided thereon. The air electrode film 3 is provided with an interconnector 6 having a connection terminal 7 shown in the upper portion in FIG. 1.

In order to connect adjacent tubular solid electrolyte fuel cells in series, the air electrode film 3 of one cell is connected to the fuel electrode film 1 of the other cell through the interconnectors 6 and the connection terminals 7. On the other hand, in order to connect them in parallel, the fuel electrode films 1 of the adjacent cells are connected to each other through nickel felts or the like. In forming the interconnector 6, a thermal sprayed film is formed on the surface of the air electrode film 3 according to the invention and heat treated.

Figure 2:
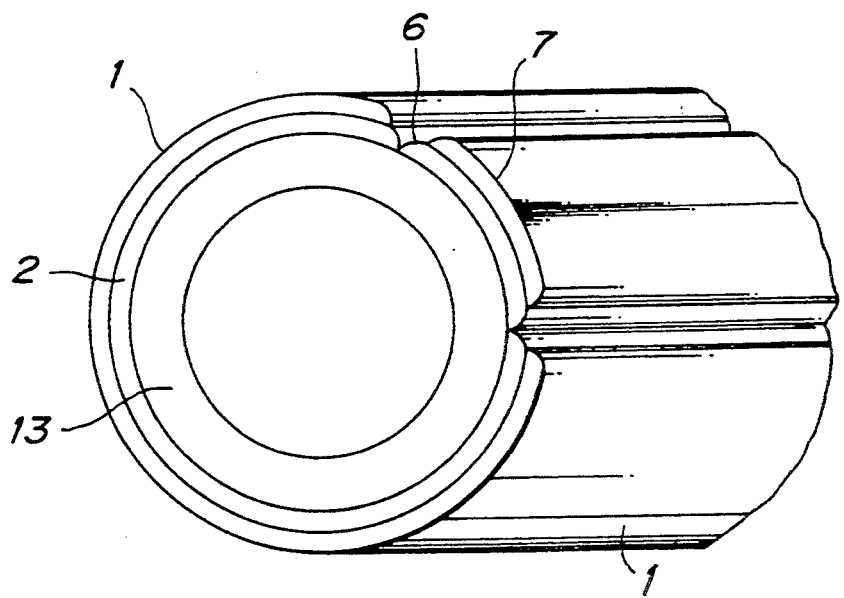
FIG. 2 is a partially removed perspective view of a tubular SOFC according to another embodiment of the invention.

The air electrode film 3 may be arranged on the outer side of the fuel electrode film 1 to the contrary shown in FIG. 1. Moreover, instead of the air electrode film 3 provided on the porous substrate 4, a tubular air electrode substrate 13 of a single layer made of an air electrode material may be used as shown in FIG. 2. In this case, an interconnector 6 is directly provided on the surface of the tubular air electrode substrate 13.

While only the open end of the tubular solid electrolyte type fuel cell on one side is shown in FIG. 1 or 2, the other end (not shown) of the cell may be opened, or may be closed to form a tubular cell having a closed end.

With flat plate-shaped solid electrolyte fuel cells, interconnectors may be formed on the surfaces of electrodes in order to connect the flat plate-shaped unit cells. The invention is also applicable to such interconnectors.

The air electrodes may be made of $LaMnO_3$, $CaMnO_3$, $LaNiO_3$, $LaCoO_3$, $LaCrO_3$ or the like doped or not, preferably $LaMnO_3$ doped with strontium or calcium. In general, the fuel electrodes are preferably made of nickel-zirconia cermet or cobalt-zirconia cermet. The solid electrolytes may be generally made of cerium oxide or zirconium oxide doped with a rare earth metal element or elements such as yttrium, etc.

Concrete examples of the interconnector will be explained hereinafter.

Materials for thermal spraying were first prepared as the following examples.

Example 1

Powders were prepared which were weighed as $La_2O_3$: 120.0g, $SrCO_3$: 27.2g, $Cr_2O_3$: 56.0g and $MnO_2$: 16.0g. These powders, 800g of gravel and 200g of water were then wet-mixed in a ball mill having a capacity of 2 liters for 3 hours to obtain a slurry. The slurry was dried at 100° C. for 20 hours. Thereafter, the obtained dried substance was disintegrated to grain diameters of less than 149 μm, and then calcined in the air at 1,200° C. for 10 hours to synthesize

$(La_{0.8}Sr_{0.2})(Cr_{0.8}Mn_{0.2})O_3$.

Example 2

Powders were prepared which were weighed as $La_2O_3$: 120.0g, $Cr_2O_3$: 53.2g and $Co_3O_4$: 3.0g. These powders, 800g of gravel and 200g of water were then wet mixed in a ball mill having the capacity of 2 liters for 3 hours to obtain a slurry. The slurry was dried at 110° C. for 20 hours. Thereafter, the obtained dried substance was disintegrated to grain diameters of less than 149 μm, and then calcined in air at 1,200° C. for 10 hours to synthesize $La(Cr_{0.95}Co_{0.05})O_3$.

Example 3

Powders were prepared which were weighed as $Y_2O_3$: 120.0g, $CaCo_3$: 18.8g and $Cr_2O_3$: 95.0g. These powders, 800g of gravel and 200g of water were then wet-mixed in a ball mill having a capacity of 2 liters for 3 hours to obtain a slurry. The slurry was dried at 110° C. for 20 hours. Thereafter, the obtained dried substance was disintegrated to grain diameters of less than 149 μm, and then calcined in air at 1,200° C. for 10 hours to synthesize $(Y_{0.85}Ca_{0.15})CrO_3$.

Example 4

Powders were prepared which were weighed as $Y_2O_3$: 120.0g, $Cr_2O_3$: 72.7g and CuO: 8.4g. These powders, 800g of gravel and 200g of water were then wet-mixed in the ball mill having a capacity of 2 liters for 3 hours to obtain a slurry. The slurry was dried at 110° C. for 20 hours. Thereafter, the obtained dried substance was disintegrated to grain diameters of less than 149 μm, and then calcined in air at 1,200° C. for 10 hours to synthesize $Y(Cr_{0.9}Cu_{0.1})O_3$.

Example 5

Powders were prepared which were weighed as $La_2O_3$: 120.0g, $SrO_3$: 46.6g and $Fe_2O_3$: 84.0g. These powders, 800g of gravel and 200g of water were then wet mixed in a ball mill having a capacity of 2 liters for 3 hours to obtain a slurry. The slurry was dried at 110° C. for 20 hours. Thereafter, the obtained dried substance was disintegrated to grain diameters of less than 149 μm, and then calcined in air at 1,200° C. for 10 hours to synthesize $(La_{0.7}Sr_{0.3})FeO_3$.

Example 6

Powders were prepared which were weighed as $La_2O_3$: 120.0g, $Fe_2O_3$: 52.9g and ZnO: 6.0g. These powders, 800g of gravel and 200g of water were then wet mixed in a ball mill having a capacity of 2 liters for 3hours to obtain a slurry. The slurry was dried at 110° C. for 20 hours. Thereafter, the obtained dried substance was disintegrated to grain diameters of less than 149 μm, and then calcined in air at 1,200° C. for 10 hours to synthesize $La(Fe_{0.9}Zn_{0.1})O_3$.

Example 7

Powders were prepared which were weighed as $Y_2O_3$: 120.0g, $CaCO_3$: 26.6g and $Fe_2O_3$: 106.0g. These powders, 800g of gravel and 200g of water were then wet mixed in a ball mill having a capacity of 2 liters for 3 hours to obtain a slurry. The slurry was dried at 110° C. for 20 hours. Thereafter, the obtained dried substance was disintegrated to grain diameters of less than 149 μm, and then calcined in air at 1,200° C. for 10 hours to synthesize $(Y_{0.8}Ca_{0.2})FeO_3$.

Example 8

Powders were prepared which were weighed as $Y_2O_3$: 120.0g, $Fe_2O_3$: 67.9g and NiO: 15.9g. These powders, 800g of gravel and 200g of water were then wet-mixed in a ball mill having a capacity of 2 liters for 3 hours to obtain a slurry. The slurry was dried at 110° C. for 20 hours. Thereafter, the obtained dried substance was disintegrated to grain diameters of less than 149 μm, and then calcined in air at 1,200° C. for 10 hours to synthesize $Y(Fe_{0.8}Ni_{0.2})O_3$.

Each synthesized product of the examples was pulverized with zirconia gravel in a pot mill to a powder of an average grain diameter of 3.5 μm. The powder was mixed with 50 parts by weight of water relative to 100 parts by weight of the total powder to obtain a slurry. The slurry was dried by a spray dryer to obtain a granulated powder of an average grain diameter of 40 μm. The granulated powders of 8 kinds thus obtained were used as thermal spraying materials, respectively. The compositions of the granulated powders are again shown in Table 1.

On the other hand, there were prepared substrates made of aluminum plates of 30 mm × 30 mm × 1 mm having a porosity of 20%. The thermal spraying materials of 8 kinds were thermally sprayed onto the aluminum substrates to a thicknesses of 500 μm by means of a plasma thermal spray gun, respectively. Thereafter, the thermal sprayed plates were ground by grinding so as to remove the aluminum substrates to leave the plasma thermal sprayed films having a thicknesses of 400 μm. The plasma thermal sprayed films were heat treated under conditions shown in Table 1 to obtain interconnector films. $N_2$ permeation coefficient and electrical conductivities of the interconnector films were measured and the results are shown in Table 1.

smaller. Further, it is noted that in the heat treatment the electrical conductivity considerably rises.

Figure 3:
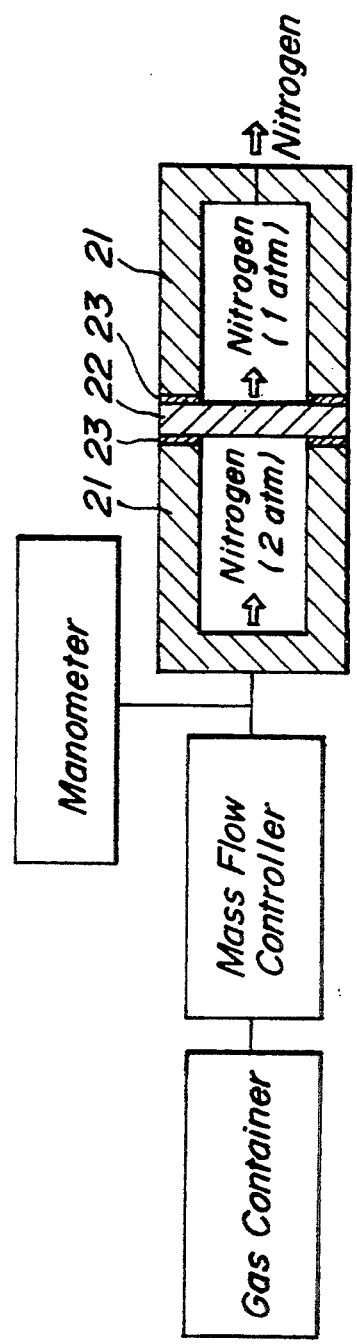
FIG. 3 is a schematic view illustrating the measuring device for $N_2$ permeation coefficient of interconnectors.

The $N_2$ permeation coefficient was measured in the following manner. As shown in FIG. 3, each of the interconnector films 22 was set between two jigs 21 and sealed to the jigs 21 with an adhesive 23. At room temperature, one surface of the interconnector film 22 was exposed to a nitrogen atmosphere under pressure of 2 atm, while the other surface was exposed to a nitrogen atmosphere of 1 atm. The flow rate of the nitrogen flowing from the side of 2 atm to the side of 1 atm was measured by means of a mass flow controller and the

TABLE 1

| | | Thermal spraying material | Heat-treatment condition | $N_2$ permeation coefficient ($\times 10^{-6}$ cm$^4$g$^{-1}$s$^{-1}$) | Electrical conductivity (siemens/cm) |
|---|---|---|---|---|---|
| | | | (a) | | |
| 1 | Comparative example 1 | $(La_{0.8}Sr_{0.2})$ | Nontreated | 6.4 | 4.6 |
| | Example 1-1 | $(Cr_{0.8}Mn_{0.2})O_3$ | 1250° C. × 5 hr | 2.9 | 10.3 |
| | Example 1-2 | " | 1400° C. × 5 hr | 1.6 | 26.6 |
| | Example 1-3 | " | 1550° C. × 5 hr | 0.1 | 27.5 |
| 2 | Comparative example 2 | $La(Cr_{0.95}Co_{0.05})O_3$ | Nontreated | 5.8 | 2.3 |
| | Example 2-1 | " | 1250° C. × 5 hr | 3.1 | 7.2 |
| | Example 2-2 | " | 1400° C. × 5 hr | 1.3 | 10.6 |
| | Example 2-3 | " | 1550° C. × 5 hr | 0.1 | 11.2 |
| 3 | Comparative example 3 | $(Y_{0.85}Ca_{0.15})CrO_3$ | Nontreated | 5.9 | 3.1 |
| | Example 3-1 | " | 1250° C. × 5 hr | 2.6 | 8.8 |
| | Example 3-2 | " | 1400° C. × 5 hr | 1.3 | 20.1 |
| | Example 3-3 | " | 1550° C. × 5 hr | 0.1 | 21.8 |
| 4 | Comparative example 4 | $Y(Cr_{0.9}Cu_{0.1})O_3$ | Nontreated | 6.8 | 2.6 |
| | Example 4-1 | " | 1250° C. × 5 hr | 2.3 | 6.8 |
| | Example 4-2 | " | 1400° C. × 5 hr | 0.9 | 14.4 |
| | Example 4-3 | " | 1550° C. × 5 hr | 0.1 | 16.4 |
| 5 | Comparative example 5 | $(La_{0.7}Sr_{0.3})FeO_3$ | Nontreated | 7.5 | 5.1 |
| | Example 5-1 | " | 1250° C. × 5 hr | 3.2 | 11.0 |
| | Example 5-2 | " | 1400° C. × 5 hr | 1.1 | 31.0 |
| | Example 5-3 | " | 1550° C. × 5 hr | 0.1 | 31.6 |
| 6 | Comparative Example 6 | $La(Fe_{0.9}Zn_{0.1})O_3$ | Nontreated | 5.4 | 2.9 |
| | Example 6-1 | " | 1250° C. × 5 hr | 2.9 | 6.5 |
| | Example 6-2 | " | 1400° C. × 5 hr | 1.2 | 20.8 |
| | Example 6-3 | " | 1550° C. × 5 hr | 0.1 | 22.1 |
| | | | (b) | | |
| 7 | Comparative example 7 | $(Y_{0.8}Ca_{0.2})FeO_3$ | Nontreated | 6.3 | 3.4 |
| | Example 7-1 | " | 1250° C. × 5 hr | 2.7 | 8.2 |
| | Example 7-2 | " | 1400° C. × 5 hr | 1.6 | 27.8 |
| | Example 7-3 | " | 1550° C. × 5 hr | 0.1 | 28.3 |
| 8 | Comparative example 8 | $Y(Fe_{0.8}Ni_{0.2})O_3$ | Nontreated | 7.1 | 2.6 |
| | Example 8-1 | " | 1250° C. × 5 hr | 3.0 | 7.0 |
| | Example 8-2 | " | 1400° C. × 5 hr | 1.4 | 17.2 |
| | Example 8-3 | " | 1550° C. × 5 hr | 0.1 | 19.4 |

Table 1

As shown in Table 1, the $N_2$ permeation coefficient of the interconnector films can be reduced by the heat treatment as compared with those which are not subjected to such a heat treatment. This means that through-pores of the films are reduced by the heat treatment so that the porosities become smaller, while the relative densities become larger. It is possible to obtain a relative density of more than 95% according to the invention.

Moreover, as the temperature of the heat treatment is higher, the $N_2$ permeation coefficient is considerably lowered to as low as $0.1 \times 10^{-6}$ cm$^4$g$^{-1}$s$^{-1}$. This may be because that in the heat treatment the open pores become closed pores and further the closed pores become $N_2$ permeation coefficient K (cm$^4$g$^{-1}$s$^{-1}$) was calculated by the following equation.

$$K = (t \cdot Q)/(\Delta P \cdot A)$$

wherein t: thickness of specimen (cm)
Q: measured flow rate (cm$^3$/s)
ΔP: pressure difference (g/cm$^2$)
A: area exposed to nitrogen (cm$^2$)

The electrical conductivity was measured in the manner that each of the interconnector films was worked to a specimen having a diameter of 14 mm and a thickness of 0.4 mm and the electrical conductivity of the specimen was measured in air at 1,000° C. by the use of platinum electrodes according to the AC impedance method.

According to the method of the invention, a material for interconnector is thermally sprayed to form a sprayed film which is then heat treated so that open pores of the sprayed interconnector film are changed to closed pores. As a result, the relative density of the film is increased to lower its porosity without leaving fine cracks and defects inherent to the plasma thermal spraying process. By the heat treatment according to the invention, the crystalline phase of the film becomes a homogeneous single phase so that the film becomes microstructually homogeneous. Therefore, the electrical conductivity of the interconnector can be improved. As the interconnector becomes airtight, it is possible to form thin films by the thermal spraying process and hence to form thin film interconnectors.

By forming the interconnector of the solid electrolyte type fuel cell from such an airtight thin film, the electrical conductivity of the interconnector is improved to lower the resistance in the cell, while preventing the fuel leakage. The output of the cell can be exceedingly increased by the synergism of these effects.

Moreover, the method according to the invention can be carried out simply by the usual plasma spray gun and the electric furnace for the heat treatment. Therefore, the invention can be practiced more easily than in the electrochemical vapor deposition and the chemical vapor deposition, and can be carried out over wider treatment areas at faster treating speeds and with lower cost.

While the invention has been particularly shown and described with reference to preferred embodiments thereof, it will be understood by those skilled in the art that the foregoing and other changes in form and details can be made therein without departing from the scope of the claims.

What is claimed is:

1. A method for producing an interconnector for a solid electrolyte fuel cell, comprising the steps of:
   preparing an interconnector material comprising a powder of at least one perovskite complexed oxide, having $ABO_3$ structure, selected from the group consisting of:
   i) lanthanum chromite represented by the formula $(La_{1-x}D_x)_{1-u}(Cr_{1-y}E_y)_{1-w}O_3$, wherein $0<x\leq0.3$, $0\leq y\leq0.3$, $u\geq O$, $w\leq0.1$, D partially substitutes for lanthanum crystallographic positions at the A site, D being at least one element selected from the group consisting of yttrium, cerium, praseodymium, neodymium, samarium, gadolinium, dysprosium, holumium, erbium, ytterbium, calcium, strontium and barium, E partially substitutes for chromium crystallographic positions at the B site, E being at least one element selected from the group consisting of titanium, vanadium, manganese, iron, cobalt, nickel, copper, zinc, magnesium, aluminum, lead, ruthenium, rhenium, niobium, molybdenum and tungsten;
   ii) chromium series complexed oxides represented by the formula $D_{1-u}(Cr_{1-y}E_y)_{1-w}O_3$ wherein $O\leq x\leq0.3$, $u\geq o$, $w\leq0.1$, D is the same as in paragraph i), E partially substitutes for chromium crystallographic positions at the B site, E being the same as in paragraph i);

iii) lanthanum series complexed oxides represented by the formula $(La_{1-x}D_x)_{1-u}E_{1-w}O_3$ wherein $0\leq x\leq0.3$, $u0$, $w\leq0.1$, D partially substitutes for lanthanum crystallographic positions at the A site, D being the same as i paragraph i), and E is the same as in paragraph i); and iv) complexed oxides represented by the formula $D_{1-u}E_{1-w}O_3$ wherein $u\geq O$, $w\geq 0.1$, and D and E are the same as in paragraph i);
   said interconnector material powder being produced by the following steps:
   (a) mixing powders of compounds of metallic elements to form a mixture;
   (b) firing the mixture to form an intermediate product of the perovskite complexed oxide;
   (c) pulverizing the intermediate product to provide a pulverized powder;
   (d) mixing the pulverized powder with a medium to form a slurry; and
   drying the slurry to provide a granulated powder having an average grain diameter of 3–100 μm;
   thermal spraying the granulated interconnector material powder onto the surface of an electrode of a solid electrolyte fuel cell to form a thermally sprayed film; and
   heat treating the thermally sprayed film at a temperature of at least 1,250° C. to form an interconnector.

2. The method of claim 1, wherein said perovskite complexed oxide comprises lanthanum chromite represented by the following formula:

$(La_{1-x}D_x)_{1-u}(Cr_{1-y}E_y)_{1-w}O_3$ wherein $0<\times\leq0.3$, $o\leq y\leq0.3$, $u\geq O$, $w\leq0.1$, D partially substitutes for lanthanum crystallographic positions at the A site, D being at least one element selected from the group consisting of yttrium, cerium, praseodymium, neodymium, samarium, gadolinium, dysprosium, holumium, erbium, ytterbium, strontium and barium, E partially substitutes for chromium crystallographic positions at the B site, E being at least one element selected from the group consisting of titanium, vanadium, manganese, iron, cobalt, nickel, copper, zinc, magnesium, aluminum, lead, ruthenium, rhenium, niobium, molybdenum and tungsten.

3. The method of claim 2, wherein at least one of the A and B sites is partially defected.

4. The method of claim 1, wherein said perovskite complexed oxide comprises chromium series complexed oxides represented by the following formula:

$D_{1-u}(Cr_{1-y}E_y)_{1-w}O_3$ wherein $o\leq y\leq0.3$, $u\geq O$, $w\leq0.1$, D is at least one element selected from the group consisting of yttrium, cerium, praseodymium, neodymium, samarium, gadolinium, dysprosium, holumium, erbium, ytterbium, calcium, strontium and barium, E partially substitutes for chromium crystallographic positions at the B site, E being at least one element selected from the group consisting of titanium, vanadium, manganese, iron, cobalt, nickel, copper, zinc, magnesium, aluminum, lead, ruthenium, rhenium, niobium, molybdenum and tungsten.

5. The method of claim 4, wherein at least one of the A and B sites is partially defected.

6. The method of claim 1, wherein said perovskite complexed oxide comprises lanthanum series complexed oxides represented by the following formula:

$$(La_{1-x}D_x)_{1-u}E_{1-w}O_3$$

wherein $0 \leq x \leq 0.3$, $u \geq 0$, $w \geq 0.1$, D partially substitutes for lanthanum crystallographic positions at the A site, D being at least one element selected from the group consisting of yttrium, cerium, praseodymium, neodymium, samarium, gadolinium, dysprosium, holumium, erbium, ytterbium, calcium, strontium and barium, and E is at least one element selected from the group consisting of titanium, vanadium, manganese, iron, cobalt, nickel, copper, zinc, magnesium, aluminum, lead, ruthenium, rhenium, niobium, molybdenum and tungsten.

7. The method of claim 1, wherein said perovskite complexed oxide comprises $D_{1-u}E_{1-w}O_3$, wherein $u \geq 0$, $w \leq 0.1$, D is at least one element selected from the group consisting of yttrium, cerium, praseodymium, neodymium, samarium, gadolinium, dysprosium, holumium, erbium, ytterbium, calcium, strontium and barium, and E is at least one element selected from the group consisting of titanium, vanadium, manganese, iron, cobalt, nickel, copper, zinc, magnesium aluminum lead ruthenium rhenium, niobium molybdenum and tungsten.

8. The method of claim 1, wherein said interconnector material is a granulated powder which is highly fluidizable.

9. The method of claim 1, wherein the thermal spraying is effected by a plasma thermal spraying process.

10. The method of claim 1, wherein the medium is water

11. The method of claim 1, wherein said perovskite complexed oxide comprises $(Y_{1-x}G_x)_{1-u}(Fe_{1-y}J_y)_{1-w}O_3$, wherein $x \geq 0$, $y \leq 0.3$, $u \geq 0$, $w \geq 0.1$ G is at least one element selected from the group consisting of calcium, strontium and barium, and J is at least one element selected from the group consisting of nickel, copper, iron, cobalt and manganese.

* * * * *